United States Patent [19]

Cama

[11] 3,925,363

[45] Dec. 9, 1975

[54] PROCESS FOR EPIMERIZING PENICILLIN COMPOUNDS, AND RELATED PRODUCTS

[75] Inventor: Lovji D. Cama, Edison, N.J.

[73] Assignee: Merck & Company, Inc., Rahway, N.J.

[22] Filed: Jan. 17, 1974

[21] Appl. No.: 434,158

[52] U.S. Cl. .................... 260/239.1, 260/307 F
[51] Int. Cl.² ........................... C07D 499/44
[58] Field of Search ............. 260/239.1, 346.2 R

[56] References Cited

UNITED STATES PATENTS 3,502,724 Bruderer ........................ 260/566 R

OTHER PUBLICATIONS

Smith, "Open Chain Nitrogen Compounds," Vol. 1, pp. 310–311 (1965).

*Primary Examiner* — Gerald A. Schwartz
*Attorney* — Hesna J. Pfeiffer, J. Jerome Behan

[57] ABSTRACT

$6\beta$-Acylamino-1-(oxadethia)penicillanic acid compounds are prepared from $6\alpha$-acylamino-$6\beta$-methylthio-1-(oxadethia)penicillanic acid compounds. The process proceeds through the formation of a 6-acylimino intermediate, which is treated using an active hydride to yield the desired $6\beta$-acylamino compound. Novel intermediates are also disclosed. The compounds prepared are useful antibiotics having enhanced activity over penicillanic acid derivatives. The process can also be applied to penicillin derivatives.

7 Claims, No Drawings

PROCESS FOR EPIMERIZING PENICILLIN COMPOUNDS, AND RELATED PRODUCTS

This invention relates to a process for changing the configuration of certain stereoisomeric penicillin compounds.

The compounds prepared by the process of this invention are the following:

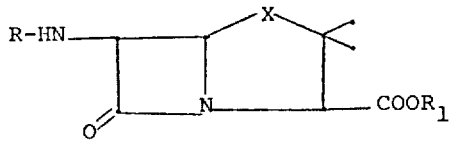

wherein X is S or O, and $R_1$ is a blocking or protecting group on the carboxy substituent, preferably one which can be removed easily without disruption of the β-lactam ring to yield the final active free acid and R is an acyl substituent, any of a number in the literature.

For example, $R_1$ can be a conventional ester group selected from trichloroethyl, tert-butyl, p-bromophenacyl, p-methoxybenzyl, benzyl, benzhydryl, trimethylsilyl, methoxymethyl, o-nitrobenzyl and the like. These ester groups may be removed by methods well known to those skilled in the art, for example, the benzyl and p-nitrobenzyl groups may be removed by hydrogenation in the presence of a catalyst such as palladium-on-carbon. The trichloroethyl and p-bromophenacyl groups may be removed by treatment with zinc and acetic acid or formic acid. The tert-butyl, p-methoxybenzyl, benzhydryl, and methoxybenzyl groups may also be removed by treatment on organic or inorganic acid. Preferred examples of these acids are formic acid, trifluoroacetic acid, and the like. The o-nitrobenzyl group can be removed by photolysis.

The acyl radical R is a conventional aliphatic, aromatic, heterocyclic araliphatic or heterocyclic aliphatic carboxylic acid radical of the formula:

wherein Y is a radical of the formula: $R^2R^3CH$—wherein $R^2$ represents hydrogen, azido, alkoxy, lower alkyl such as methyl and the like, phenyl, halo, amino, guanidino, guanylureido, phosphono, hydroxy, tetrazolyl, carboxy, sulfo or sulfamino. The amino, hydroxy, or carboxy groups are protected from reaction by blocking with an easily removable group. $R^3$ represents phenyl, substituted phenyl, a 5- or 6-membered monocyclic heterocycle containing one to four oxygen, sulfur, or nitrogen hetero atoms in the ring such as furyl, thienyl, thiazolyl, isothiazolyl, oxadiazolyl, thiadiazolyl, and the like, substituted heterocyclic thio groups, cyano or (2,5-cyclohexadiene-1-yl); Y also is substituted phenyl, a 3-substituted phenyl-substituted isoxazol-4-yl, a 3-substituted phthalazin-1-yl or 2-substituted-1-napthyl. Also included among the acyl radicals of interest is 1-amino-cyclohexyl or cyclopentyl. The substituents can be halo, carboxy, carboxymethyl, guanidino, guanidino-methyl, carboxaminomethyl, aminomethyl, nitro, methoxy or methyl. Especially preferred are those acyl radicals where $R^2$ is hydrogen, hydroxy, amino or carboxy and $R^3$ is phenyl or a 5- or 6-membered heterocyclic ring containing from 1 to 2 sulfur, oxygen or nitrogen hetero atoms. Examples of some preferred radicals are phenylacetyl, 3-bromophenylacetyl, p-aminomethylphenylacetyl, 4-carboxymethylphenylacetyl, 4-carboxamidomethylphenylacetyl, 2-furylacetyl, 5-nitrofurylacetyl, 3-furylacetyl, 5-chlorothienylacetyl, 5-methoxythienylacetyl, α-guanidino-2-thienylacetyl, 3-methylisothiazolylacetyl, 5-isothiazolylacetyl, 3-chloroisothiazolylacetyl, 3-methyl-1,2,5-thiadiazolyl-4-acetyl 3-chloro-1,2,5-thiadiazolyl-4-acetyl, 3-methoxy-1,2,5-thiadiazolyl-4-acetyl, phenylthioacetyl, 4-pyridylthioacetyl, cyanoacetyl, tetrazolylacetyl, α-fluorophenylacetyl, D-phenylglycyl, 4-hydroxy-D-phenylglycyl, 2-thienylglycyl, 3-thienylglycyl, phenylmalonyl, 3-chlorophenylmalonyl, 2-thienylmalonyl, 3-thienylmalonyl, α-phosphonophenylacetyl, α-sulfaminophenylacetyl, α-hydroxyphenylacetyl, α-sulfaminophenylacetyl, α-hydroxyphenylacetyl, α-tetrazolylphenylacetyl, α-sulfophenylacetyl, 2-thienylacetyl, phenoxyacetyl, α-phenoxypropionyl, α-phenoxyphenylacetyl, 2-phenylnaphthyl-1-1-, 5-methyl-3-phenylisoxazol-4-carbonyl, 5-methyl-3-(2-chlorophenyl)isoxazol-4-carbonyl, 5-methyl-3-(2-chloro-6-fluorophenyl)isoxazol-4-carbonyl, α-(3-guanylureido)phenylacetyl, α-amino-p-hydroxyphenylacetyl, α-phenyl-β-amino-propionyl, α-azidophenylacetyl, 2,6-dimethoxybenzoyl, 2,6-dichlorobenzoyl, 3-(2', 6'-dichloro)-phenyl-4-methylisoxazol-4-carbonyl, 1-amino-cyclohexylcarbonyl, 1-(2,5-cyclohexadiene-1-yl)glycyl and 3-carboxyphthalazin-1-yl.

The term "lower alkyl" as used herein means both straight and branched chain aliphatic hydrocarbon radicals having from 1 to 10 carbon atoms such as methyl, ethyl, propyl, isopropyl, n-butyl, isobutyl, tert-butyl, amyl, hexyl, 2-ethylhexyl, heptyl, decyl, and the like.

The compounds of Formula I, above, are known chemically as 6-acylamino-1-(oxadethia)penicillanic acid esters. The compounds are useful as new antibiotics.

The above structural formula can also be written using the following conventions to distinguish the stereo-configuration:

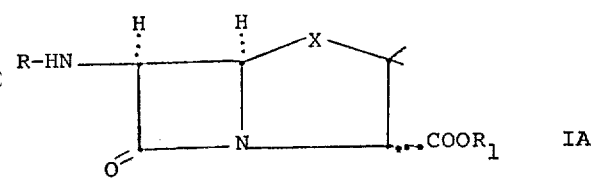

In Formula IA, the dotted lines connecting the two hydrogen atoms to the ring indicate that the hydrogen atoms are down from the plane of the β-lactam ring; the straight line connecting the nitrogen indicates that it is up from the plane of the ring. Accepted usage in the penicillin art assumes the configuration at IA when the structural formula of I is written; this is because the configuration of IA is that of the "normal" or biologically active penicillin, and is that which is produced by any fermentation process.

There is another possible steric configuration for a pencillin, which is:

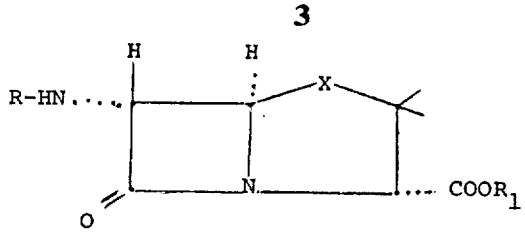

IB

In this formula, the nitrogen and the hydrogen at position 5 is α, or down from the ring; the hydrogen at position 6 is β, or up from the ring. This type of configuration is termed "epi" penicillin.

Common usage has accepted that of IA as "normal" and has accepted the α, β nomenclature, and the dotted vs. straight lines as indicating the biologically active penicillin. This convention is used for all penicillin derivatives having substituents at either of the two positions available at carbon 6.

As has been stated, when naturally occurring penicillin is employed, it is in the "normal" configuration. However, during the course of chemical reactions on the penicillin, or when the penicillin nucleus is prepared by total synthesis, compounds are obtained in the "epi" configuration. More specifically, others in the same laboratories of the invention have completed work on a total synthesis procedure which yields in varying proportions, the epi, or 6α-acylamino penicillin, of Formula IB. In order to prepare high yields of active and commercially valuable antibiotics, it has been necessary to provide a route to "epimerize" (meaning change the configuration) the "epi" to the "normal" penicillin.

It is, therefore, a purpose of this invention to provide an epimerization procedure to convert the 6α-acylamino-1-oxadethiapenicillin to 6β-acylamino-1-oxadethiapenicillin. (In this connection, it is noted that it is unnecessary to specify the configuration of both substituents on the 6-carbon; if the nitrogen configuration is indicated, the other substituent, i.e., the hydrogen, is obviously the other configuration.) It is an additional object of the invention to provide the desirable "normal" penicillin in high yield, whether the starting material is pure "epi" material, or a mixture of epi and normal.

In summary, this invention provides the following procedure to accomplish the above objects: (In the following Flow Sheet, the substituents R, X, and $R_1$ and Y are as defined previously.)

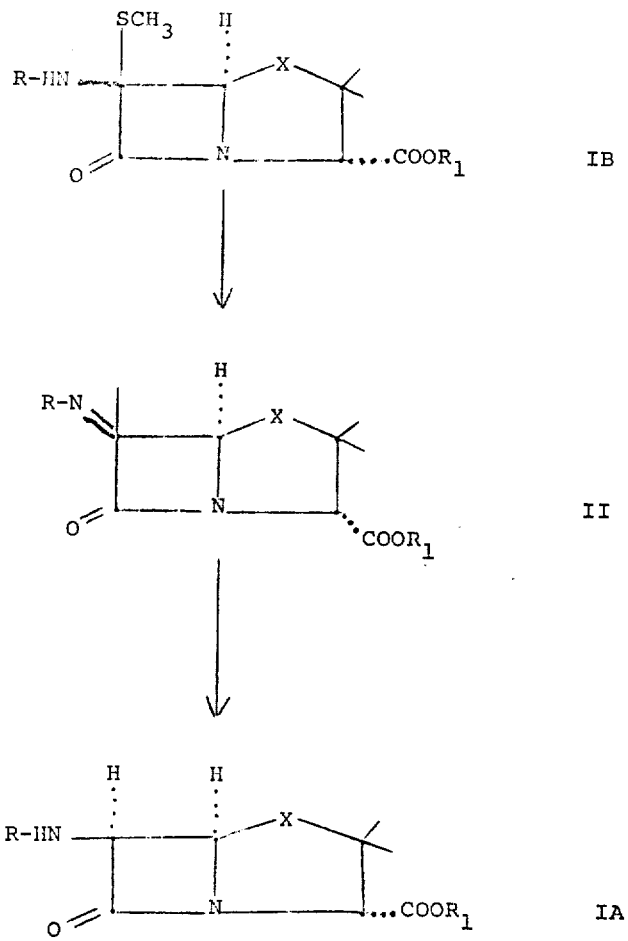

The novel process of the invention starts with the 6α-acylamino-6-thiomethyl penicillin IB. This starting material is prepared as in solution, in an inert solvent, such as tetrahydrofuran, chloroform, or the like, and cooled to below about 0°C., and preferably between about −100°C. to 0°C.

Molecular chlorine is solution, the solvent being carbon tetrachloride or the like, is then added to the solution of IB. A molecular excess (from 1–5 times) of chlorine is employed, as compared with the amount of IB. At this point, the composition of the reactive intermediate is primarily compound II. This acylimino intermediate is not isolated or otherwise characterized.

The mixture is stirred at the low temperature for a few minutes, although this is not a critical step. An active hydride in solution is then added, all at the same low temperature.

The "active hydride" employed can be any of a number of inorganic compounds having a hydrogen anion, such as lithium aluminum trialkoxy hydride wherein the alkoxy group is straight or branched 1–5 carbons, e.g., lithium aluminum tri-t-butoxy hydride, or lithium aluminum trimethoxy hydride; sodium borohydride, lithium borohydride, lithium borohydride cyanide ($LiBH_3CN$), and others. The active hydride is employed in molecular excess, (1–5 times the amount of IB). Following addition of the hydride, the mixture is stirred for a few minutes then allowed to warm to ambient temperature or 0°C. to ambient. Following washing and evaporation, the pure product IA can be recovered, using normal methods, such as preparative thin layer chromatography.

The final 6β-acylamino products are valuable antibacterial agents useful against gram-positive and gram-negative bacteria. This activity includes effectiveness against many bacteria, including in vivo on *Escherichia coli*, *Proteus vulgaris*, *Salmonella schottmuelleri*, *Klebsiella pneumoniae Ad*, and *Klebsiella pneumoniae B*. Specific bactericidal activity is dependent upon the exact structure of the final product; not all compounds are active against all organisms.

The final active antibiotic agents can be used to combat bacterial infections in animals or humans. They can be employed in dosages and administrative forms similar to that employed for commerically available cephalosporins and penicillins. Exact dose levels and modes of administration can be readily determined by one skilled in the art. Generally, between 0.1 –500 mg./kg. body weight can be employed to give effective antibacterial control.

The 1-oxadethia penicillin starting materials for this process are not a part of this invention, but are disclosed and claimed in copending U.S. applications in the names of Burton G. Christensen and Ronald W. Ratcliffe, U.S. Ser. No. 340,802, filed Mar. 13, 1973; U.S. Ser. No. 397,516, filed Sept. 17, 1973; Case 15370IB, filed simultaneously herewith.

The 6α-acylamino-6-thiomethyl-1-oxadethiapenicillanic acid is obtained from a 6α-amino-6-thiomethyl-1-(oxadethia)penicillanic acid by acylating using conventional acylation processes. The latter compound is prepared from the 6α-amino-1-(oxadethia)penicillanic acid ester by reacting with a substituted or unsubstituted benzaldehyde in an inert solvent to prepare a 6α-imino derivative. The imino derivative is then activated with a strong base, such as sodium hydride, potassium-t-butoxide, phenyl lithium, or the like, followed by treating with methyl sulfinylchloride to substitute in the methyl thio group. The benzaldehyde derivative is removed by treatment with an acid in the presence of an amine.

The 6α-amino-1-(oxadethia)pencillanic acid derivative is obtained by reducing the corresponding 6α-azido-1-(oxadethia)penicillin with hydrogen in the presence of a noble metal catalyst such as platinum oxide, palladium-on-charcoal, ruthenium, rhodium, or the like.

The 6α-azido-1-(oxadethia)penicillinates are prepared by a ten-step synthesis, the last step of which comprises ring closure. This method comprises starting with ethyl 2-formamido-3-hydroxy-3-methylbutyrate and then: (a) forming the free acid 2-formamido-3-hydroxy-3-methylbutyric acid, by removal of the ester group; (b) hydrolyzing the formamido group of said acid to form the corresponding amine compound, 2-amino-3-methyl-3-hydroxybutyric acid, as its hydrochloride salt; (c) protecting the carboxy function by esterification to protect said carboxy function in subsequent reactions, these blocking groups are as defined above under the definition of $R_1$; (d) treating the protected 2-amino-3-hydroxy-3-methylbutyric acid with a lower alkyl ester of thionoformic acid such as ethylthionoformate in the presence of hydrogen sulfide, this reaction is generally conducted in an inert solvent such as benzene, carbon tetrachloride, methylene chloride or hexane at a temperature of 0°C. to 40°C., to afford the esterified 2-thioformamido-3-hydroxy-3-methylbutyric acid; (e) protecting the hydroxy function by treating the hydroxy compound with a suitable known blocking reagent such as dihydropyran in the presence of an acid such as p-toluenesulfonic acid or trimethylsilyl chloride, to afford the esterified 2-thioformamido-3-protected hydroxy-3-methylbutyric acid; (f) treating the hydroxy protected compound with a methylating agent, such as methyl iodide, in the presence of a base such as potassium carbonate, in a suitable inert solvent such as acetone or dimethylformamide, to afford the esterified 2-(0-methylthioformimidato)-3-protected hydroxy-3-methylbutyric acid; (g) treating the O-methyl substituted compound with azidoacetyl chloride and an acid scavenger, for example, a tertiary amine, which also catalyzes the cyclo addition to afford the lactam ring containing compounds of the following structural formula:

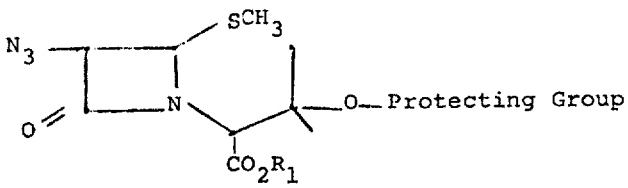

(h) removing the hydroxy protecting group in a known manner, for example, by treatment with an acid such as hydrochloric acid perchloric acid and the like, to afford the free hydroxy compound 1-(1'-R$_1$-oxycarbonyl-2'-methyl-2'-hydroxypropyl)-3-azido-4-methylthio-2-azetidinone; (i) replacing the 4-methylthio group with chlorine by treating said azetidinone with a chlorinating agent, such as chlorine, in a suitable inert solvent such as methylene chloride, chloroform or benzene, at a temperature in the range from about 0°C. to about 40°C. to afford the correspondingly substituted 4-chloroazetidinone; and (j) treating the 4-chloro compound with a dehalogenating agent such as silver fluoroborate, silver oxide or silver trifluoromethanesulfonate in a suitable solvent such as methylene chloride, tetrahydrofuran, toluene or chloroform to afford the desired esterified 6α-azido-1-(oxadethia)penicillanate of the following structural formula:

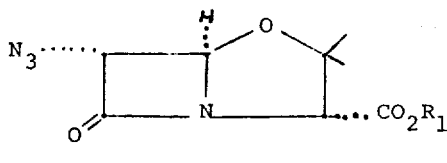

V wherein R$_1$ is as defined above.

The 6α-acylamino-6-thiomethyl penicillanic acid derivatives are prepared using analogous processes or other synthetic procedures described in the art which yield either 6α-penicillins or epimeric mixtures.

It is appreciated that this invention process works on pure 6α-epimers, or on mixtures of 6α-epimers with the 6β-normal penicillins. The desired product is essentially free from the undesirable epimer, and is recovered in the pure, or uncontaminated, state.

The following Example is used to illustrate a representative preparation of an intermediate.

PREPARATIVE EXAMPLE

Benzyl 6α-phencylacetamindo-6-methylthio-1-oxadethia penicillinate

Step A Benzyl 2-Oxazoline-5,5-dimethyl-4-carboxylate

Ethyl 2-oxazoline-5,5-dimethyl-4-carboxylate is prepared as described by H.D. Hoffe and U. Schollkopf (Angew. Chem. Internat. Edit. 9, 300 (1970).

10g. ethyl 2-oxazoline-5,5-dimethyl-4-carboxylate is dissolved in 20 ml. benzyl alcohol. 0.150 G. of NaH is added and the mixture allowed to stand at room temperature for 2 hours. Benzene (100 ml.) is added and the mixture evaporated under reduced pressure (temp. 30°C.). The residue is allowed to stand a further 2 hours and addition of benzene and evaporation is repeated. After 5 such evaporations, 100 ml. of C$_6$H$_6$ is added and the mixture is washed once with pH 3 buffer then with brine and dried, evaporated and distilled at 0.3 mm to give, after a forerun of benzyl alcohol, b.p. 50°–65°C., benzyl 2-oxazoline-5,5-dimethyl-4-carboxylate (b.p. 125°–130°C., 8.1 g.).

i.r. μ (film); 5.70 (ester C=O), 6.1 (C=N). nmrτ(CDCl$_3$); 2.66 (C$_6$H$_5$);

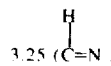

3.25 (C=N,

J=2 cps) 4.86 (C$_6$H$_5$CH$_2$);

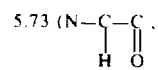

5.73 (N—C—C,
        H  O

J=2 cps); 8.56 and 8.83 (CH$_3$—C).

Step B Benzyl 2-Amino-3-hydroxy-3-methylbutyrate

To 8.1 g. of the benzyl 2-oxazoline-5,5-dimethyl4-carboxylate is added 0.9 ml. H$_2$O and 0.3 ml. triethylamine. The reaction mixture is heated with stirring at 100° for 3 hours. 15 Ml. of 5 N HCl is then added and the mixture is cooled, diluted with water to 50 ml. and extracted with 2 × 25 ml. of CH$_2$Cl$_2$. The aqueous layer is taken to pH 10 with 50% NaOH and extracted with CH$_2$Cl$_2$ 4 × 30 ml. The combined CH$_2$Cl$_2$ extract is washed once with brine and dried and evaporated to give benzyl 2-amino-3-hydroxy-3-methylbutyrate (5.9 g.).

i.r. μ: 3.95 (NH and OH); 5.75 (ester C=O). nmr τ, (CCl$_4$); 2.7 (C$_6$H$_5$); 4.9 (C$_6$H$_5$CH$_2$);

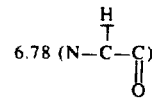

6.78 (N—C—C)
       H  O 7.75 (NH and OH); 8.83 and 9.0 (CH$_3$—C).

Step C: Benzyl 2-Thioformamido-3-hydroxy-3-methylbutyrate 5.9 G. of benzyl 2-amino-3-hydroxy-3-methylbutyrate is placed in a thick walled tube and treated with 5 ml. of ethyl thionoformate. The tube is cooled to −78° and 5 ml. of H$_2$S are condensed into the tube. The tube is sealed, the contents are allowed to come to room temperature and thoroughly mixed and the tube is allowed to stand at room temperature overnight. The tube is cooled to −78° and the seal broken. The H$_2$S is allowed to evaporate and the residue is taken up in CH$_2$Cl$_2$ and filtered. The filtrate is evaporated to give 6.1 g. of benzyl 2-thioformamido-3-hydroxy-3-methylbutyrate.

i.r. μ: 3.0 (NH and OH); 5.75 (ester); 6.65 and

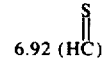

6.92 (HC)

nmr τ, (CCl$_4$);

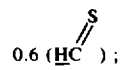

0.6 (HC);

0.86 (NH); 2.7 (C$_6$H$_5$); 4.86 (C$_6$H$_5$CH$_2$); 6.53 (OH); 8.73 and 9.0 (CH$_3$—C).

Step D: Benzyl 2-Thioformamido-3-trimethylsilyloxy-3-methylbutyrate

Benzyl 2-thioformamido-3-hydroxy-3-methylbutyrate (8.1 g.) is dissolved in CH$_2$Cl$_2$ (100 ml.) and treated with trimethylsilyl chloride (12 ml.) and 1,1,1,3,3,3-hexamethyldisilazane (16 ml.) and allowed to stir overnight at room temperature. The solution is filtered and the filtrate is evaporated under reduced pressure to give a residue which on chromatography on silica gel using 25% EtOAc/C$_6$H$_6$ as eluant gives benzyl 2-thioformamido-3-trimethylsilyloxy-3-methylbutyrate (6.62 g.).

i.r. μ, 3.0 (NH); 5.75 (ester); 6.68 and

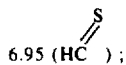
6.95 (HC );

9.7 and 11.8 (Si—O).

nmrτ0.55 (H—C); 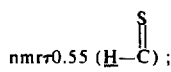

2.0 (NH); 2.66 (C$_6$H$_5$); 4.86 (C$_6$H$_5$CH$_2$); 8.62 and 8.7 (CH$_3$C); 9.93 (CH$_3$—Si).

Step E: Benzyl 2-(S-Methylthioimidato)-3-trimethylsilyloxy-3-methylbutyrate

Benzyl 2-thioformamido-3-trimethylsilyloxy-3-methylbutyrate (20 g.) is dissolved in 200 ml. of anhydrous acetone and treated with 9 g. of powdered anhydrous K$_2$CO$_3$ and 4.6 ml. of methyl iodide. The reaction mixture is stirred under N$_2$ for 24 hours then evaporated under reduced pressure. The residue is taken up in 100 ml. of CCl$_4$ and filtered and the residue washed with 50 ml. CCl$_4$. The combined filtrate and washings are evaporated to give 20.15 g. of benzyl 2-(S-methylthioimidato)-3-trimethylsilyloxy-3-methylbutyrate.

i.r. (film): 5.75 (ester); 6.26 (C=N); 9.6 and 8.85 (Si—O). nmrτ(CCl$_4$); 1.93 (H-C=N); 2.73 (C$_6$H$_5$); 4.92 (C$_6$H$_5$CH$_2$);

6.16 (N—C—C) ;
         |
         H 7.63 (CH$_3$-S); 8.67 and 8.73 (CH$_3$—C); 9.93 (CH$_3$—Si).

Step F:
1-(1-Benzyloxycarbonyl-2-methyl-2trimethylsilyloxy)-propyl-3-azido-4methylthio-2-azetidinone To 25 ml. of dry CH$_2$Cl$_2$ under N$_2$ is added 2.42 ml. of azidoacetyl chloride (1.5 eq) and the mixture is cooled to −78°. Triethylamine (3.74 ml., 1.5 eq) in 25 ml. CH$_2$Cl$_2$ is then added over 15 minutes and the mixture is allowd to stir at −78° for 1 hour.

Benzyl 2-(S-methylthioimidato)-3-trimethylsilyloxy-3-methyl-4-butyrate (6.67 g.) in 25 ml. CH$_2$Cl$_2$ is then added dropwise over 15 minutes. The reaction mixture is stirred a further 10 min. at −78° and then allowed to warm to room temperature over 3 hours and then stirred a further ½ hour. The reaction mixture is washed once with water then with brine and dried and evaporated to give crude product. Chromatography on silica gel using 5% EtOAc/C$_6$H$_6$ as eluant gives 2.81 g.(37%) of 1-(1-benzyloxycarbonyl-2-methyl-2-trimethylsilyloxy)-propyl-3-azido-4-methylthio-2-azetidinone.

i.r. μ (film): 4.70 (N$_3$); 5.61 (β-lactam); 5.70 (ester); 9.6 and 11.85 (Si—O); nmr τ (CCl$_4$); 2.68 (C$_6$H$_5$); 4.88 (C$_6$H$_5$CH$_2$); 5.46 and 5.63 (β-lactam protons);

5.92 (N—C—CO) ;
       |
       H 7.96 (CH$_3$—S);
8.56 and 8.6 (CH$_3$-C); 9.90 (CH$_3$—Si).

Step G:
1-(1-Benzyloxycarbonyl-2-methyl-2-trimethylsilyloxy)-propyl-3-azido-4-chloro2-azetidinone 1-(1-Benzyloxycarbonyl-2-methyl-2-trimethylsilyloxy)-propyl-3-azido-4-methylthio-2-azetidinone (2 g.) is dissolved in 20 ml. CCl$_4$ and treated with 4.69 ml. (1.3 eq) of a solution of 2 g. Cl$_2$ in 20 ml. CCl$_4$. The reaction mixture is allowed to stand at room temperature for one minute and then evaporated under reduced pressure. The residue is dissolved in 20 ml. C$_6$H$_6$ and evaporated and the procedure is repeated. The residue is 1-(1-benzyloxycarbonyl-2-methyl-2-trimethylsilyloxy)-propyl-3-azido-4-chloro-2-azetidinone (1.9 g.).

i.r. μ (film); 4.7 (N$_3$); 5.59 (β-lactam C=O); 5.70 (ester carbonyl).

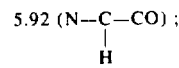
nmrτ(CDCl$_3$): 2.6 (C$_6$H$_5$); 3.72 (cis );

4.33

(trans ——Cl) ;

4.8 (C$_6$H$_5$CH$_2$); 5.26 (trans and cis

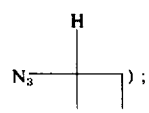

5.75

(N—C—C) ;
 |  ||
 H  O 8.53 and 8.6 (CH$_3$—C); 9.85 (CH$_3$—Si).

Step H:
1(1-Benzyloxycarbonyl-2-methyl-2-hydroxy)propyl-3-azido-4-chloro-2-azetidinone 1-(1-Benzyloxycarbonyl-2-methyl-2-trimethylsilyloxy)-propyl-3-azido-4-chloro-2-azetidinone (1.9 g.) is dissolved in 20 ml. dioxane and 10 ml. H$_2$O. 2.5 Ml. of 2.5 N HCl solution is added and the mixture allowed to stand at room temperature for 15 minutes. The reaction mixture is neutralized with pH 7 phosphate buffer and is extracted with CHCl$_3$. The CHCl$_3$ extract is washed once with brine and dried and evaporated to give 1-(1-benzyloxycarbonyl-2-methyl-2-hydroxy)-propyl-3-azido-4-chloro2-azetidinone (1.57 g.).

i.r. μ (film); 2.9 (OH); 4.7 (N$_3$); 5.60 (β-lactam) 5.75 (ester C=O). nmr τ(CDCl$_3$); 2.58 (C$_6$H$_5$;

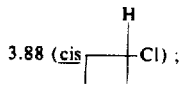

3.88 (cis —|—Cl);

4.48

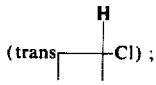

(trans —|—Cl);

4.72 ($C_6H_5C\underline{H}_2$); 5.25

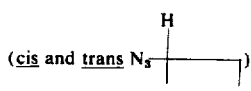

(cis and trans $N_3$—|—)

5.92

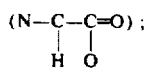

(N—C—C=O);
       |   |
       H   O 8.6 and 8.66 ($C\underline{H}_3$—C).

Steip I: Benzyl 6α-Azido-1-oxadethiapenicillanate 1-(1-Benzyloxycarbonyl-2-methyl-2-hydroxy)propyl-3-azido-4-chloro-2-azetidinone (1.25 g.) is dissolved in 120 ml. THF and cooled to 5°. Silver trifluoromethylsulfonate (0.900 g.) in 10 ml. THF is added dropwise over 1 minute and the reaction mixture is stirred 5 min. and then is diluted with benzene and washed once with pH 7 buffer containing brine. The organic phase is separated. The aqueous phase is extracted once with $C_6H_6$ and the combined organic phase is washed once with brine, then dried and evaporated to give crude product. Chromatography on silica gel using 5% EtOA/$C_6H_6$ as eluant gives 0.115 g. of benzyl 6α-azido-1-oxadethiapenicillanate.

i.r. μ (film); 4.7 ($N_3$); 5.6 (β-lactam); 5.71 (ester). nmrτ(CDCl$_3$); 2.64 ($C_6\underline{H}_5$); 4.79 ($C_6H_5C\underline{H}_2$); 4.91 (C—5 H) (J = 1 cps); 5.5 (C—6 H) (J = 1 cps); 6.3 (C—3 H) 8.63 and 8.8 (gem CH$_3$).

Step J: Benzyl 6α-Amino-1-oxadethiapenicillanate

Benzyl 6α-azido-1-oxadethiapenicillanate (0.115 g.) is dissolved in 8 ml. $C_6H_6$. 0.050 G. of PtO$_2$ is added and the mixture is reduced under H$_2$ at 40 lbs. for 1 hour. The catalyst is removed by filtration through a bed of silica gel G and eluting with ethylacetate. The filtrate is evaporated to give 0.102 g. of benzyl 6α-amino-1-oxadethiapenicillanate.

i.r. (film); 3.0 (NH); 5.6 (β-lactam C=O); 5.72 (ester C=O).

nmrτ(CDCl$_3$); 2.6 ($C_6\underline{H}_5$); 4.8 ($C_6H_5C\underline{H}_2$); 4.95 (C—5 H, J = 1 cps); 5.8 (C—6 H, J = 1 cps); 6.23 (C—3 H); 7.3 (N$\underline{H}_2$); 8.61 and 8.75 (gem CH$_3$).

Step K: Benzyl 6α-p-Nitrobenzalimino-1-oxadethiapenicillanate

Benzyl 6α-amino-1-oxadethiapenicillanate (0.102 g.) is dissolved in 10 ml. CH$_2$Cl$_2$ and 0.050 g. of pnitrobenzaldehyde and 2 g. of MgSO$_4$ is added and the mixture is stirred at room temperature for 2 hours and filtered. The filtrate is evaporated and the residue purified by preparative tlc to give 0.069 g. of benzyl 6αp-nitrobenzalimino-1-oxadethiapenicillanate.

i.r. μ (film); 5.59 (β-lactam C=O); 5.72 (ester C=O); 6.1 (C=N)

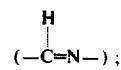

(—C=N—);
  |
  H 1.86

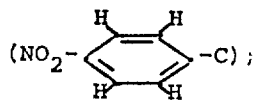

($NO_2$—⟨⟩—C);

2.6

($C_6\underline{H}_5$); 4.58 (C—6 H, J = 1 cps); 4.76 ($C_6H_5$—C$\underline{H}_2$); 5.1 (C—5 H, J = 1 cps); 6.2 (C—3 H); 8.53 and 8.71 (gem CH$_3$).

Step L: Benzyl 6-p-Nitrobenzalimino-6-methylthio1-oxadethiapenicillanate

Benzyl 6α-p-nitrobenzalamino-1-oxadethiapenicillanate (0.080 g.) is dissolved in 4 ml. THF and cooled to −78° under N$_2$. Phenyllithium (0.082 ml.) (2.3 M soln. in $C_6H_6$/Et$_2$O) is added dropwise and the mixtures is stirred 1 minute at −78°. DMF (4 ml.) is then added and the mixture is stirred at −78° for 1 min. and then treated with methyl sulfenyl chloride (0.015 g.) in 0.15 ml. of THF. The mixture is stirred for 5 min. at −78° and then allowed to warm to −20°. $C_6H_6$ (20 ml.) is added and the mixture is washed once with pH 7 buffer and then 4 times with water, then dried and evaporated. The residue is purified by preparative thin layer chromatography on silica gel G using 5% EtOc/$C_6H_5$ as eluant to give 0.017 g. of benzyl 6-p-nitrobenzalimino-6-methylthio-1-oxadethiapenicillanate.

i.r. μ (film); 5.59 (β-lactam C=O); 5.72 (ester C=O); 6.1 (C=N) nmrτ(CDCl$_3$);

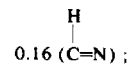

0.16 (C=N);

1.86

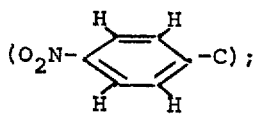

($O_2N$—⟨⟩—C);

2.65 ($C_6\underline{H}_5$); 4.68 (C—5 H); 4.8 ($C_6H_5C\underline{H}_2$); 6.1 (C—3 H); 7.53 (S—CH$_3$); 8.53 and 8.79 (gem CH$_3$).

Step M: Benzyl 6-Amino-6-methylthio-1-oxadethiapenicillanate p-Toluenesulfonic Acid Salt Benzyl 6-p-nitrobenzalimino-6-methylthio-1oxadethiapenicillanate [(0.111 g.) crude product without purification] is dissolved in 1 ml. THF. 2,4-Dinitrophenylhydrazine (0.045 g.) and p-toluenesulfonic acid monohydrate (0.0425 g.) are mixed in 2 ml. THF for 1 hour at room temperature. The solution of the Schiff base prepared above is added and the mixture is stirred at room temperature for 15–20 min. The reaction mixture is filtered and the residue washed with 1 ml. THF. The filtrate and washings are evaporated to give benzyl 6-amino-6-methylthio-1-oxadethiapenicillanate p-toluenesulfonic acid salt.

Step N: Benzyl 6-Phenylacetamido-6-methylthio1-oxadethiapenicillanate

Benzyl 6-amino-6-methylthio-1-oxadethiapenicillanate p-toluene sulfonic acid salt obtained from 0.111 g. of crude benzyl 6-p-nitrobenzalimino-6-methylthio-1-oxadethiapenicillanate is dissolved in 4 ml. $CH_2Cl_2$ and cooled to 0°. Pyridine (0.068 ml.) and phenylacetyl chloride (0.034 ml.) are added and the mixture is stirred for 15 min. and then diluted with $CH_2Cl_2$ and washed once with pH 7 buffer then with pH 3 buffer and then once again with pH 7 buffer. The $CHCl_3$ solution is dried and evaporated. The residue is purified by preparative thin layer chromatography on silica gel G using 25% $EtOAc/C_6H_6$ as eluant to give 0.032 g. of benzyl 6-phenyl-acetamido-6-methylthio1-oxadethiapenicillanate.

i.r. μ (film); 2.95 (NH); 5.59 (β-lactam C=O); 5.75 (ester C=O); 5.95 (amide C=O); 6.72 (amide II). nmr τ($CDCl_3$); 2.6 and 2.7 ($C_6H_5$); 3.63 (N$\underline{H}$); 4.7 (C—5 H);
4.81 ($C_6H_5$—C$\underline{H}_2$O); 6.19 (C—3 H); 6.45 ($C_6H_5$C$\underline{H}_2$C=O); 3.75 (S—$CH_3$); 8.6 and 8.86 (gem $CH_3$).

The following examples illustrate the invention of of this application:

Example 1

Benzyl 6β-phenylacetamido-1-oxadethiapenicillanate and its sodium salt

Benzyl 6α-phenylacetamido-6-methylthio-1-oxadethiapenicillanate (0.080 g.) is dissolved in THF (2 ml.) and cooled to −78° under $N_2$. Chlorine (1.3 eq) in 0.162 ml. of $CCl_4$ is added and the mixtures is stirred for 3-½ min. Lithium tributoxyaluminum hydride (0.151 g.) (3.0 eq) in 1 ml. THF is added and the mixture is stirred for a further 5 min. and then allowed to come to 0°. Chloroform is added and the mixture is washed with pH 3 buffer and then with pH 7 buffer then dried and evaporated to give 0.076 g. of crude product. Purification by preparative thin layer chromatography on silica gel G, 25% $EtOAc/C_6H_6$ eluant gives 0.017 g. of benzyl 6β-phenylacetamido-1-oxadethiapenicillanate.

i.r. μ (film): 2.95 (NH); 5.57 (β-lactam C=O); 5.73 (ester C=O); 5.97 (amide C=O); 6.59 (amide II). nmr τ($CDCl_3$); 2.63 and 2.73 ($C_6\underline{H}_5$); 3.84 (NH, J=9 cps);
4.63 (C—6 H, J=9 and J=3 cps); 4.79 (C—5 H, J=3 cps); 4.86 ($C_6H_5$C$\underline{H}_2$); 6.19 (C—3 H); 6.42 ($C_6H_5$C$\underline{H}_2$_C=O); 8.62 and 8.87 (gem $CH_3$).

Step B: Sodium 6β-Phenylacetamido-1-oxadethiapenicillanate

Benzyl 6β-phenylacetamido-1-oxadethiapenicillanate (0.007 g.) is dissolved in 1 ml. dioxane in 1 ml. dioxane and 0.5 ml. $H_2O$. Sodium bicarbonate (0.0015 g.) and 10% Pd/C (Bolhofer catalyst) (0.003 g.) is added and the mixture is reduced under $H_2$ at 40 lbs. for 0.5 hr. The catalyst is filtered off and the filtrate is extracted with $CHCl_3$, recovering the product, sodium 6β-phenylacetamido-1-oxadethiapenicillanate.

Example 2

Benzyl 6β-benzyloxycarbonylamino-1-oxadethiapenicillanate

Step A: Benzyl 6α-benzyloxycarbonylamino-6-methylthio-1-oxadethiapenicillanate Benzyl 6α-amino-6-methylthio-1-oxadethiapenicillanate p-toluene sulfonic acid salt (0.508 g.) is dissolved in 10 ml. $CH_2Cl_2$, cooled to 0° and treated with 0.300 ml. pyridine and then with 0.200 g. of benzyloxycarbonyl chloride. The reaction mixture is stirred at 0° for 15 minutes and then 1 hour at room temperature and then washed with pH 7 buffer and then pH 3 buffer and then again with pH 7 buffer. The organic phase is dried and evaporated. Chromatography on silica gel 25% $EtOAc/C_6H_6$ give benzyl 6α-benzyloxycarbonylamino-6-methylthio-1-oxadethiapenicillanate.

Step B: Benzyl 6β-benzyloxycarbonylamino-1-oxadethiapenicillanate

Benzyl 6α-benzyloxycarbonylamino-6-methylthio-1-thiapenicillanate (0.321 g.) is dissoved in 15 ml. THF, cooled to −78° under $N_2$ and treated with 0.047 g. of $Cl_2$ in 0.47 ml. $CCl_4$. After 5 minutes, 0.420 g. of lithium tri-t-butoxyaluminum hydride in 4 ml.THF is added and the mixture is allowed to stir at −78° for 5 minutes and then allowed to warm to room temperature. The reaction mixture is diluted with $CHCl_3$ and washed once with pH 3 buffer and then with pH 7 buffer then dried and evaporated to give a residue which is chromatographed on silica gel using 25% $EtOAc/C_6H_6$ as eluant to give benzyl 6β-benzyloxycarbonylamino-1-oxadethiapenicillanate.

Example 3

Benzyl 6β-phenylacetamido penicillanate Benzyl 6α-methylthio-6-phenylacetamidopenicillanate (0.148 g.) is dissolved in 6 ml. tetrahydrofuran and cooled to −78° under nitrogen. Chlorine (0.028 g.) in 0.28 ml. carbon tetrachloritde is added and the mixture is stirred at −78° to give the acylimine for 5 min. LiAl(OtBu)$_3$H (0.240 g.) in 3 ml. tetrahydrofuran is then added dropwise over 1 min. The reaction mixture is stirred at −78° for 5 min. and allowed to warm to 0°. The mixture is diluted with chloroform and washed once with pH 3 buffer then with pH 7 buffer, then dried and evaporated to give crude product. Preparative tlc on silica gel using 15% ethylacetate/ benzene as eluant gives 0.031 g. of benzyl 6β-phenylacetamidopenicillanate.

Example 4

0-Nitrobenzyl-6β-phenoxyacetamido-1-oxadethia penicillanate o-Nitrobenzyl-6-phenoxyacetamido-6-methylthio-1-oxadethiapenicillanate (0.073 g.) is dissolved in 5 ml. THF, cooled to −78°C. and treated with 13 mg. of $Cl_2$ in 0.26 ml. of $CCl_4$. After 5 minutes, 0.140 g. of lithium tributoxy aluminum hydride in 2 ml. THF is added and the mixture is stirred at −78°C. for 5 min. and allowed to come to 0°C. The reaction mixture is poured into pH 3.0 buffer and extracted with $CHCl_3$. The $CHCl_3$ extract is dried and evaporated to give 0.072 g. of crude product. Purification by preparative tlc (silica gel 25% $EtOAc/C_6H_6$) gives 0.019 g. of o-nitrobenzyl6β-phenoxyacetamido-1-oxade-thiapenicillanate. i.r. μ(film): 3.0 (NH); 5.55 (β-lactam C=O); 5.72 (ester C=O); 5.91 (amide, C=O); 6.51 ($NO_2$). nmr τ($CDCl_3$) 1.8–3.2 (ArH); 4.42 (ArC$\underline{H}_2$O); 4.52 (J=10, J=3) q (C—6 H); 4.69, d (J=3) (C—5 H)] 5.48, s (C$_6$H$_5$O—CH$_2$); 6.08, s (C—3 H); 8.52 & 8.66 (gem dimethyl).

The new dl penicillin compounds prepared as described above can be resolved by methods known in the art to obtain the enantiomers. Thus, for example, the esters can be cleaved to produce the free acids which can be reacted with optically active bases, the resulting diastereomeric salts can be separated by fractional crystallization, and the optically active salts can be converted to other salts such as amine and metals salts which are suitable for therapeutic use.

The dl penicillin compounds and the active enantiomers are valuable antimicrobial substances which are active against various gram-positive and gram-negative pathogens such as *Bacillus subtilis*, *Salmonella schottmuelleri* and *Proteus vulfaris*. Thus, the free acid and especially the salts thereof such as amine and metal salts, particularly rhe alkali metal and alkaline earth metal salts, are useful bactericides and can be used for removing susceptible pathogens from dental and medical equipment, for separating microorganisms, and for therapeutic use in humans and animals. For this latter purpose pharmacologically acceptable salts with inorganic and organic bases such as those known in the art and used for the administration of penicillins and cephalosporins can be utilized. For example, salts such as alkali metal and alkaline earth metal salts, and primary, secondary and tertiary amine salts can be used for this purpose. These salts can be combined with pharmaceutically acceptable liquid and solid vehicles to form suitable dosage unit forms such as pills, tablets, capsules, suppositories, syrups, elixers and the like which can be prepared in accordance with procedures well known in this art. The products of this invention may be used alone or in combination as the active ingredient in any one of a variety of pharmaceutical preparations. These antibiotics and their corresponding salts may be employed in capsule form or as tablets, powders or liquid solutions or as suspensions or elixirs. They may be administered orally, intravenously or intramuscularly. Suitable carriers which may be used in the composition include, for example, mannitol, sucrose, glucose or sterile liquids such as water, saline, glycols and oils of petroleum, animal, vegetable or synthetic origin as, for example, peanut oil, mineral oil or sesame oil. Also, in addition to a carrier the instant compositions may include other ingredients such as stabilizers, binders, antioxidants, perservatives, lubricators, suspending agents, viscosity agents or flavoring agents. In addition, there may also be included in the composition other active ingredients to provide a broader spectrum of antibiotic activity.

The dosage to be administered depends to a large extent upon the condition of the subject being treated and the weight of the host, the parenteral route being preferred for generalized infections and the oral route for intestinal infections. In general, a daily dosage consists of from about 15 to about 600 mg. of active ingredient per kg. of body weight of the subject in one or more applications per day.

One typical unit dosage form consists in mixing 120 mg. of the sodium salt of 6β-phenylacetamido-1-oxadethiapenicillanic acid with 20 mg. of lactose and 5 mg. of magnesium stearate and placing the 145 mg. mixture into a No. 3 gelatin capsule. Similarly, by employing more of the active ingredient and less lactose, other dosage forms can be put up in No. 3 gelatin capsules and should it be necessary to mix more than 145 mg. of ingredients together, larger capsules such as compressed tablets and pills can also be prepared. The following example is illustrative.

Dry-Filled Capsule Containing 120 mg. of the Sodium Salt of 6β-phenylacetamido-1-oxadethiapenicillanic Acid

| | Per Capsule |
|---|---|
| Sodium salt of 6β-phenylacetamido-1-oxadethiapenicillanic acid | 120 mg. |
| Lactose | 20 mg. |
| Magnesium Stearate | 5 mg. |
| Capsule Size No. 3 | 145 mg. |

The sodium salt of 6β-phenylacetamido-1-oxadethiapenicillanic acid is reduced to a No. 60 powder and then lactose and magnesium stearate are passed through a no. 60 bolting cloth onto the powder and the combined ingredients admixed for 10 minutes and then filled into No. 3 dry gelatin capsules.

What is claimed is:

1. The process for reducing a 6-acylimino penicillin having the formula

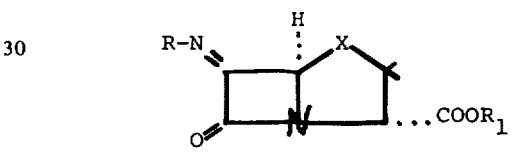

wherein X is O or S, R is a conventional pharmaceutically acceptable acyl group, and R$_1$ is an easily removable conventional ester blocking group which comprises reacting, in an inert solvent, at a temperature of between about −10°C. to −60°C., the compound above with an active hydride selected from the group consisting of lithium aluminum trialkoxy hydride, sodium borohydride, lithium borohydride, or lithium borohydride cyanide followed by warming the reaction mixture to about 0°C., and recovering the compound:

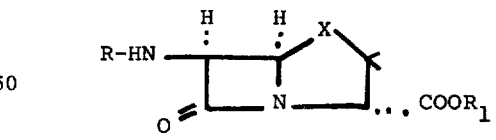

thereby produced.

2. The process of claim 1 wherein the active hydride compound is lithium triethoxy aluminum hydride, or lithium cyanohydrido borate (LiBH$_3$CN).

3. The process of claim 1 wherein R is R$^3$ R$_2$ CHCO- wherein R$^2$ is hydrogen, and R$^3$ is phenyl, thienyl, furyl, isothiazolyl, thiadiazolyl, pyridyl, phenoxy, isoxazolyl, thiazolyl, or tetrazolyl.

4. The process of claim 3 wherein R$^2$ is hydrogen, and R$^3$ is phenyl or phenoxy.

5. The process of claim 4 wherein X is oxygen.

6. The process of claim 4 wherein X is sulfur.

7. The process of claim 4 wherein R$_1$ is benzyl or o-nitrobenzyl.

* * * * *